(12) United States Patent
Kim et al.

(10) Patent No.: US 9,178,543 B2
(45) Date of Patent: Nov. 3, 2015

(54) VIRTUAL RECEPTION DIVERSITY APPARATUS AND METHOD IN WIRELESS COMMUNICATION SYSTEM

(71) Applicant: Samsung Electronics Co. Ltd., Suwon-si, Gyeonggi-do (KR)

(72) Inventors: Deok-Hwan Kim, Anseong-si (KR); Min-Goo Kim, Hwaseong-si (KR); Seong-Wook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/075,304

(22) Filed: Nov. 8, 2013

(65) Prior Publication Data

US 2014/0233626 A1   Aug. 21, 2014

(30) Foreign Application Priority Data

Feb. 20, 2013  (KR) .................. 10-2013-0018125

(51) Int. Cl.
| | |
|---|---|
| *H04B 1/10* | (2006.01) |
| *H04B 7/08* | (2006.01) |
| *H04J 11/00* | (2006.01) |
| *H04L 25/03* | (2006.01) |

(52) U.S. Cl.
CPC .. *H04B 1/10* (2013.01); *H04B 7/08* (2013.01); *H04J 11/004* (2013.01); *H04L 25/03006* (2013.01)

(58) Field of Classification Search
CPC ............. H04B 1/7107; H04B 1/71072; H04B 1/71075; H04B 1/7105; H04B 1/7097; H04B 7/0848; H04B 7/0615; H04B 1/7103; H04B 7/0845; H04B 7/15578; H04B 1/10; H04B 7/08; H04J 11/004; H04L 25/03006

USPC .................. 375/350, 229, 260, 267, 295, 316
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,128,355 | A * | 10/2000 | Backman et al. | 375/347 |
| 6,940,932 | B2 * | 9/2005 | Henriksson | 375/347 |
| 8,457,227 | B2 * | 6/2013 | Lin | 375/260 |
| 2005/0277400 | A1 | 12/2005 | Shah | |
| 2006/0013327 | A1 | 1/2006 | Sugar et al. | |

(Continued)

FOREIGN PATENT DOCUMENTS

WO      02/29993 A1    4/2002

OTHER PUBLICATIONS

Rabah Maoudji et al., "Post-combiner for Interference Cancellation Algorithm", Software, Telecommunications and Computer Networks (Softcom), (Sep. 11, 2012), pp. 1-5, XPO32470569, ISBN: 978-1-4673-2710-7.

*Primary Examiner* — Dhaval Patel
(74) *Attorney, Agent, or Firm* — Jefferson IP Law, LLP (57) ABSTRACT

A receiving apparatus in a wireless communication system is provided. The receiving apparatus includes a first interference cancellation unit configured to cancel interference from a received signal that is received through an antenna according to a first scheme, a second interference cancellation unit configured to cancel interference from the received signal that is received through the antenna according to a second scheme, and a combination unit configured to combine the signal from which interference is cancelled according to the first scheme and the signal from which interference is cancelled according to the second scheme.

16 Claims, 5 Drawing Sheets

(56) References Cited

U.S. PATENT DOCUMENTS

| | | | |
|---|---|---|---|
| 2006/0198292 A1* | 9/2006 | Yoshii et al. | 370/208 |
| 2006/0292988 A1* | 12/2006 | Yuen et al. | 455/62 |
| 2009/0252237 A1 | 10/2009 | Ma et al. | |
| 2011/0171920 A1* | 7/2011 | Kim et al. | 455/257 |

* cited by examiner

VIRTUAL RECEPTION DIVERSITY APPARATUS AND METHOD IN WIRELESS COMMUNICATION SYSTEM

CROSS-REFERENCE TO RELATED APPLICATION(S)

This application claims the benefit under 35 U.S.C. §119 (a) of a Korean patent application filed on Feb. 20, 2013 in the Korean Intellectual Property Office and assigned Serial No. 10-2013-0018125, the entire disclosure of which is hereby incorporated by reference.

TECHNICAL FIELD

The present disclosure relates to a receiving apparatus in a wireless communication system.

BACKGROUND

Generally, wireless communication uses a limited frequency resource. Therefore, wireless signals that are different from or identical to each other are transmitted and received within a narrow band. Consequently, interference occurs between frequencies. The interference occurring between frequencies may be classified roughly into co-channel interference and adjacent channel interference according to the type of interference. According to the to the related art, various techniques for canceling co-channel interference and adjacent channel interference are used depending on the employed technology of wireless communication. When interference cancellation techniques are indiscreetly used even in a case in which no interference is present, performance may be degraded. Therefore, techniques for detecting whether there is interference are already known.

Figure 1:
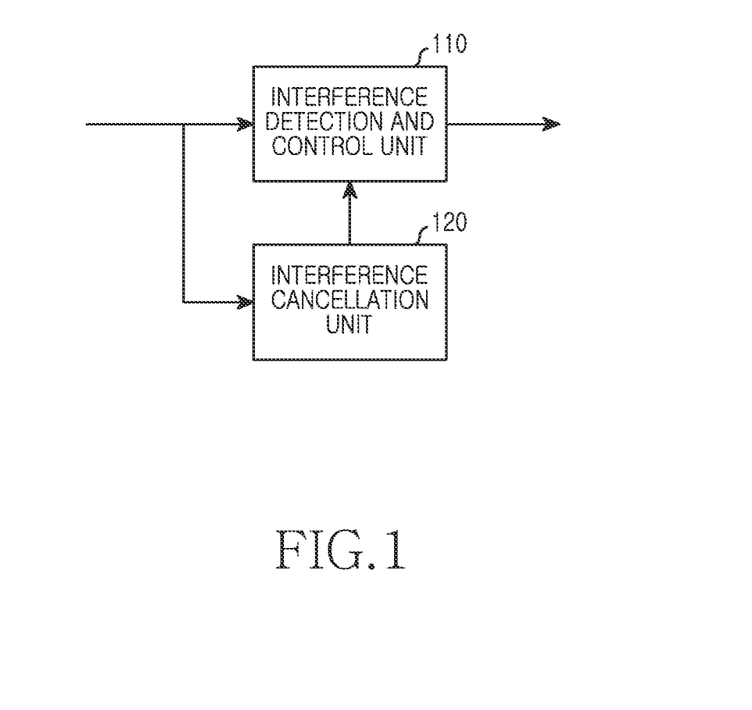
FIG. 1 is a diagram illustrating a block configuration of a unit for detecting and canceling interference in a wireless communication system according to the related art.

For example, means for detecting whether interference occurs and for canceling interference according to a result of detection may be configured as illustrated in FIG. 1.

FIG. 1 is a diagram illustrating a block configuration of a unit for detecting and canceling interference in a wireless communication system according to the related art.

Referring to FIG. 1, the interference cancellation means includes an interference detection and control unit 110 and an interference cancellation unit 120. The interference detection and control unit 110 detects an interference signal and controls application of interference cancellation techniques depending on a situation. The interference cancellation unit 120 cancels interference from a received signal according to the control of interference detection and control unit 110. The interference detection and control unit 110 detects the magnitude of the interference signal and controls the interference cancellation unit 120 according to the magnitude. The interference detection and control unit 110 and the interference cancellation unit 120 use different signal processing methods according to the types of the interference signal (e.g., adjacent channel interference signal and co-channel interference signal).

Interference cancellation techniques according to the related art consider only one type interference. Therefore, when two or more multi-interferences are cancelled, high operation complexity is required. Generally, in an area in which frequency resources are scarce, a multi-interference having two types of interferences occurs in many cases. Therefore, in a receiving apparatus having a plurality of interference cancellation devices, interference is cancelled by applying respective interference cancellation devices according to a situation. In this case, when two or more interference cancellation units are used, and the respective interference cancellation devices are influenced by one another, the receiving apparatus is required to determine the influence of the respective interference cancellation devices in advance and to control the respective cancellation units. However, in practice, determining the effects that the respective cancellation units have on one another in advance is very difficult or nearly impossible.

Figure 2:
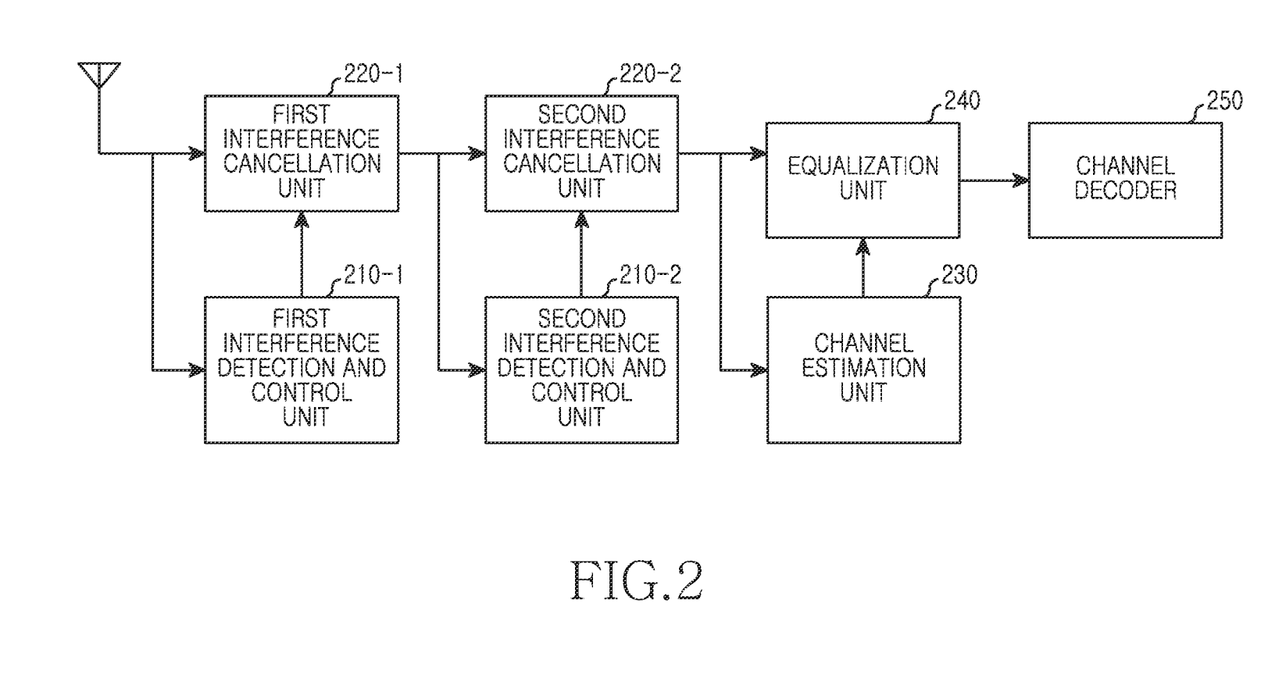
FIG. 2 is a diagram illustrating a block configuration of a receiving apparatus including a plurality of interference cancellation units in a wireless communication system according to the related art.

A receiving system for canceling a multi-interference signal using a plurality of cancellers for canceling a single type interference signal in a wireless communication system is configured as illustrated in FIG. 2. An interference signal generally needs to be cancelled before an equalization unit. Therefore, when two or more interference cancellation units are used, the interference cancellers are connected in series as illustrated in FIG. 2.

FIG. 2 is a diagram illustrating a block configuration of a receiving apparatus including a plurality of interference cancellation units in a wireless communication system according to the related art.

Referring to FIG. 2, a first interference detection and control unit 210-1 and a first interference cancellation unit 220-1 are provided in order to cancel first interference, and a second interference detection and control unit 210-2 and a second interference cancellation unit 220-2 are provided in order to cancel second interference. In this case, the blocks for canceling the first interference (e.g., the first interference detection and control unit 210-1 and the first interference cancellation unit 220-1) and the blocks for canceling the second interference (e.g., the second interference detection and control unit 210-2 and the second interference cancellation unit 220-2) are connected in series. A channel estimation unit 230, an equalization unit 240, and a channel decoder 250 are connected subsequently thereto.

A problem does not occur when a plurality of interference cancellation units operate independently without interfering with each other. However, the signal processing algorithms of employed interference cancellation units influence each other with respect to signal processing methods as a result of the characteristics thereof. In addition, when reception performance is influenced due to the above-described reason, the respective interference cancellation units connected in series as illustrated in FIG. 2 may not be controlled independently. For example, when co-channel interference and adjacent channel interference both exist, the case of using only a co-channel interference cancellation unit may represent better performance than the case of using both the co-channel interference cancellation unit and an adjacent channel interference cancellation unit. The reason for this is that the characteristics of the adjacent channel interference cancellation unit has an influence on the signal processing process of the co-channel interference cancellation unit, so that the quality of a received signal is degraded in a co-channel interference cancellation process.

As described above, when two types of interference signals exist, the receiving apparatus needs to estimate influence occurring between interference cancellation units and determine an optimal control combination. However, determining the influence between interference cancellation units is difficult, thereby hardly determining the optimal control combination.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for efficiently combining a plurality of interference cancellation units in a wireless communication system.

Another aspect of the present disclosure is to provide an apparatus and method for canceling interference in a situation where there are a plurality of interference in a wireless communication system.

Another aspect of the present disclosure is to provide an apparatus and method for applying different signal processing processes to a received signal in a wireless communication system.

Another aspect of the present disclosure is to provide an apparatus and method for generating a plurality of virtual received signals from one received signal by applying different interference cancellation methods in a wireless communication system.

Another aspect of the present disclosure is to provide an apparatus and method for combining a plurality of virtual received signals generated from one received signal in a wireless communication system.

In accordance with an aspect of the present disclosure, a receiving apparatus in a wireless communication system is provided. The receiving apparatus includes a first interference cancellation unit configured to cancel interference from a received signal that is received through an antenna according to a first method, a second interference cancellation unit configured to cancel interference from the received signal that is received through the antenna according to a second method, and a combination unit configured to combine the signal from which interference is cancelled according to the first method and the signal from which interference is cancelled according to the second method.

In accordance with another aspect of the present disclosure, a method for operating a receiving apparatus in a wireless communication system is provided. The method includes canceling interference from a received signal that is received through an antenna according to a first method, canceling interference from the received signal that is received through the antenna according to a second method, and combining the signal from which interference is cancelled according to the first method and the signal from which interference is cancelled according to the second method.

In accordance with another aspect of the present disclosure, receiving apparatus in a wireless communication system is provided. The receiving apparatus includes a plurality of interference cancellation units connected in parallel to each other and configured to cancel interference from a signal received through an antenna independently according to different methods, a combination unit configured to combine the signals from which interference is cancelled independently according to the different methods, and a decoder configured to combine decoding on the signal combined by the combination unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to an apparatus and method for efficiently combining a plurality of interference cancellation units in a wireless communication system. Various embodiments of the present disclosure provide a technique for efficiently combining a plurality of interference cancellation units in a wireless communication system.

Various embodiments of the present disclosure roughly provide two characteristic configurations. A first characteristic configuration is to cancel respective interference signals from a received signal and to equalize the signal, and a second characteristic configuration is to combine two equalized signals.

Specifically, a receiving apparatus according to various embodiments of the present disclosure includes an interference cancellation unit for canceling an interference signal from a received signal and an equalization unit for eliminating the influence of fading by equalizing the signal from which the interference signal is cancelled. The interference cancellation unit may include an interference signal detection unit and an interference signal cancellation unit, and the equalization unit may include a channel estimation unit. In this case, according to various embodiments of the present disclosure, the interference cancellation unit is provided in plurality to correspond to the number of interference signal types and in a parallel arrangement. One received signal received through an antenna is provided to the respective interference cancellation units as an input. Signals processed by the plurality of the interference cancellation units connected in parallel are driven from the one received signals but have different characteristics. Owing to the above-described configuration, there occurs a similar influence as in a case in which a plurality of received signals is generated through a plurality of antennas. For example, a plurality of virtual received signals is generated. Therefore, various embodiments of the present disclosure may obtain a reception diversity effect using the plurality of virtual received signals.

The reception diversity is a method used to improve the performance of the received signal in a wireless communication system, and may be classified into a space diversity and a frequency diversity. The plurality of received signals are combined according to a specific method before being input to the channel decoder, thereby improving signal quality. For example, the reception diversity method improves the influence of fading by combining the received signals according to the specific method based on a fact that the fading types of received signals received through different antennas are different from each other. Accordingly, the reception diversity method provides a larger gain as fading correlation between the received signals decreases. As described above, the reception diversity technology generally requires two or more reception antennas. However, the receiving apparatus according to various embodiments of the present disclosure generates a plurality of virtual diversity received signals through different interference cancellation units even when one reception antenna is only provided, thereby obtaining the reception diversity method.

Therefore, the receiving apparatus further includes a unit for equalizing the virtual diversity received signals and a unit for combining the equalized signals. For example, respective types of interference signals are cancelled from an identical received signal, and the signals of which fading information of a channel is equalized are combined before decoding. In this case, the receiving apparatus combines the virtual diversity received signals based on the combination ratios $a_{i=0}$ to $a_{i=N}$ of the respective equalized signals as in the following Equation (1):

$$\text{combined\_y}(t) = \frac{\sum_{i=1}^{N} a_i * y_i(t)}{\sum_{i=1}^{N} a_i} \quad \text{Equation (1)}$$

where combined_y(t) denotes a combined signal, $y_i(t)$ denotes an i-th equalized signal from which an interference signal is cancelled, a, denotes a combination ratio, for example, a weight that is applied to the i-th equalized signal from which an interference signal is cancelled, and N denotes the number of virtual diversity received signals.

When the virtual diversity received signals are combined as described above, combination ratios applied to respective received signals may vary according to specific embodiments of the present disclosure. For example, the combination ratios may be defined to have an identical value, or may be defined to have different values according to the characteristics of the respective signals. For this, the receiving apparatus may further include a unit for calculating the combination ratios. After combining the signals, the receiving apparatus performs decoding by using the combined signal.

Hereinafter, the configuration and operation of the receiving apparatus for performing interference cancellation are described in detail with reference to figures.

Figure 3:
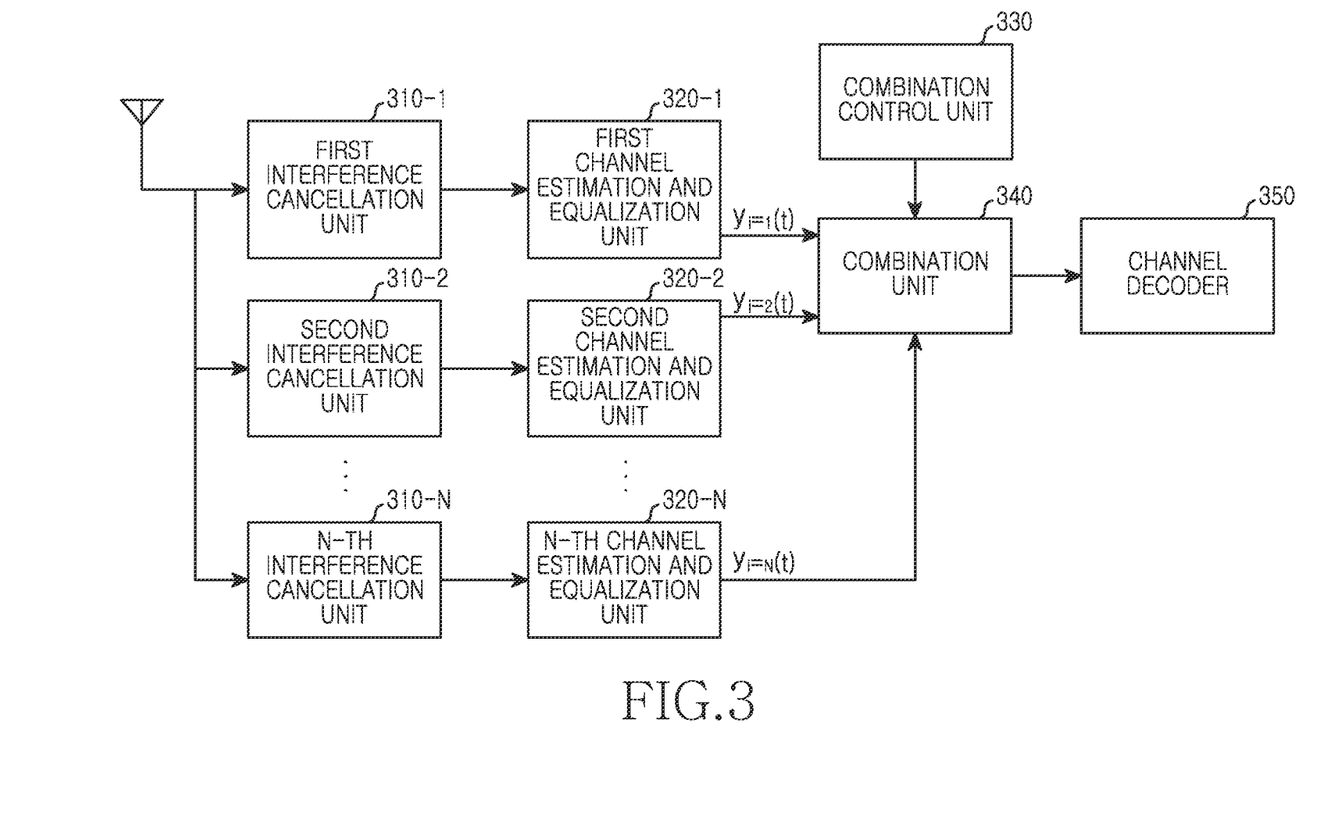
FIG. 3 is a diagram illustrating a block configuration of a receiving apparatus in a wireless communication system according to an embodiment of the present disclosure.

FIG. 3 is a diagram illustrating a block configuration of a receiving apparatus in a wireless communication system according to an embodiment of the present disclosure.

Referring to FIG. 3, the receiving apparatus includes a plurality of interference cancellation units 310-1 to 310-N, a plurality of channel estimation and equalization units 320-1 to 320-N, a combination control unit 330, a combination unit 340, and a channel decoder 350.

The plurality of interference cancellation units 310-1 to 310-N receive a signal received through an identical (e.g., a common) receiving antenna and determine whether interference occurs. Thereafter, the plurality of interference cancellation units 310-1 to 310-N cancel interference from the received signal according to relevant interference cancellation methods. In this case, the plurality of interference cancellation units 310-1 to 310-N cancel different types of interferences. For example, the first interference cancellation unit 310-1 determines whether co-channel interference occurs and cancels the co-channel interference. In this case, the first interference cancellation unit 310-1 may cancel the co-channel interference according to a Mean Square Error (MSE) method. For example, the first interference cancellation unit 310-1 may perform a Mono Interference Cancellation (MIC) method that is the MSE method used in a Global System for Mobile Communications (GSM) system. A cost function used in the MIC method is expressed as Equation (2):

$$J = \sum_{k=0}^{K} \left| \text{Re}\left\{ \sum_{l=0}^{q_p} p[l]r[k-l] \right\} - \sum_{l=0}^{q_d} d[l]a[k-k_0-l] \right|^2 \quad \text{Equation (2)}$$

where J denotes a cost, $q_p$ is the number of filter coefficients of a MIC filter, and $q_d$ is the channel length of an output signal from which co-channel interference is cancelled. r[k] denotes a received signal, p[l] denotes the coefficient of a MIC filter, d[l] denotes the estimated Channel Impulse Response (CIR) of an output signal from which co-channel is cancelled, and a[l] denotes a transmitted signal from a transmitter.

Specifically, when the MIC method is performed, the first interference cancellation unit 310-1 determines a filter p for minimizing a cost value as in Equation (2) by using information about a transmitted signal which is already known to a receiver, performs filtering by using the determined filter, and performs projection, thereby canceling the co-channel interference.

For example, the second interference cancellation unit 310-2 determines whether adjacent channel interference occurs and cancels the adjacent channel interference. For example, the second interference cancellation unit 310-2 may determine whether the adjacent channel interference occurs based on reception power for each channel. In addition, the second interference cancellation unit 310-2 may cancel the adjacent channel interference according to a Low Pass Filter (LPF) method. For example, when the LPF method is applied, the second interference cancellation unit 310-2 may cancel an interference signal outside the determined bandwidth of the received signal by using a receiving filter designed to have a bandwidth smaller or slightly larger than the bandwidth of the received signal.

As illustrated in FIG. 3, the receiving apparatus includes three or more interference cancellation units. However, according to various embodiments of the present disclosure, the receiving apparatus may have a various number of interference cancellation units. For example, according to another embodiment of the present disclosure, the receiving apparatus may include only two interference cancellation units.

The plurality of channel estimation and equalization units 320-1 to 320-N estimate a channel by using the interference-cancelled signals which are provided from the respective interference cancellation units 310-1 to 310-N, and equalizes the interference-cancelled signals. For example, the plurality of channel estimation and equalization units 320-1 to 320-N compensate for signal distortion in the channel by using a channel estimation value. For example, the first channel estimation and equalization unit 320-1 estimates the channel by using a signal from which interference is cancelled by the first interference cancellation unit 310-1. The channel estimation may be performed by using at least one of a pilot signal, a preamble signal, a midamble signal, and a reference signal. In addition, the first channel estimation and equalization unit 320-1 removes the influence of fading applied to the signal by using the channel estimation value. For example, the first channel estimation and equalization unit 320-1 determines the distortion level of the channel and performs distortion compensation. As illustrated in FIG. 3, the receiving apparatus includes a plurality of the channel estimation and equalization units. However, according to various embodiments of the present disclosure, the receiving apparatus may include a various number of channel estimation and equalization units. For example, according to another embodiment of the present disclosure, the receiving apparatus may include only one channel estimation and equalization unit. In this case, the one estimation and equalization unit may repeatedly process respective signals from the respective interference cancellation units 310-1 to 310-N.

The combination control unit 330 determines the combination ratios of the signals, each of which interference is cancelled and which is equalized, provided from the respective channel estimation and equalization units 320-1 to 320-N. According to an embodiment of the present disclosure, when the combination radios are defined equally, the combination control unit 330 may be omitted. According to another embodiment of the present disclosure, when the combination ratios are previously defined, the combination control unit 330 provides the predefined combination ratios to the combination unit 340. According to another embodiment of the present disclosure, the combination control unit 330 may calculate the combination ratios in consideration of channel environment, interference level, or the like. For example, the combination control unit 330 may calculate the combination ratios according to a Maximum Ratio Combining (MRC) method. Specifically, the combination control unit 330 may estimate the magnitude of noise added to the signals, each of which interference is cancelled and which is equalized, and may determine the combination ratios such that each of the combination ratios is inversely proportional to the magnitude of noise, in order words, such that relative weights decrease as the noise increases. According to another embodiment of the present disclosure, the combination control unit 330 may determine the combination ratios based on the magnitude of the signal rather than the magnitude of the noise. For example, the combination control unit 330 may determine the combination ratios such that relative weights increase as the magnitude of the signal increases.

As another example, an Equal Gain Combining (EGC) method, a selective combining method or the like may be used in addition to the MRC method. In the case of the EGC method, the combination control unit 330 makes the weights of respective signals equal. For example, in the case of the EGC method, all a values in Equation (1) are equally applied. In the case of the selective combining method, the combination control unit 330 may set the weight of any one of signals to be combined to 1 and the weights of the remaining signals to 0.

The combination unit 340 combines the signals, each of which interference is cancelled and which is equalized, provided from the respective channel estimation and equalization units 320-1 to 320-N. For example, the combination unit 340 generates a signal to be decoded by combining the signals, each of which interference is cancelled and which is equalized. Therefore, a reception diversity gain is generated. In this case, the combination unit 340 provides weights to the respective signals according to the combination ratios provided from the combination control unit 330.

The channel decoder 350 performs decoding by using the signal combined by the combination unit 340. The decoding is performed correspondingly to encoding performed by a transmitting apparatus. The decoding may be a binary decoding or an M-ary decoding, the alphabet size of which is 3 or more.

Figure 4:
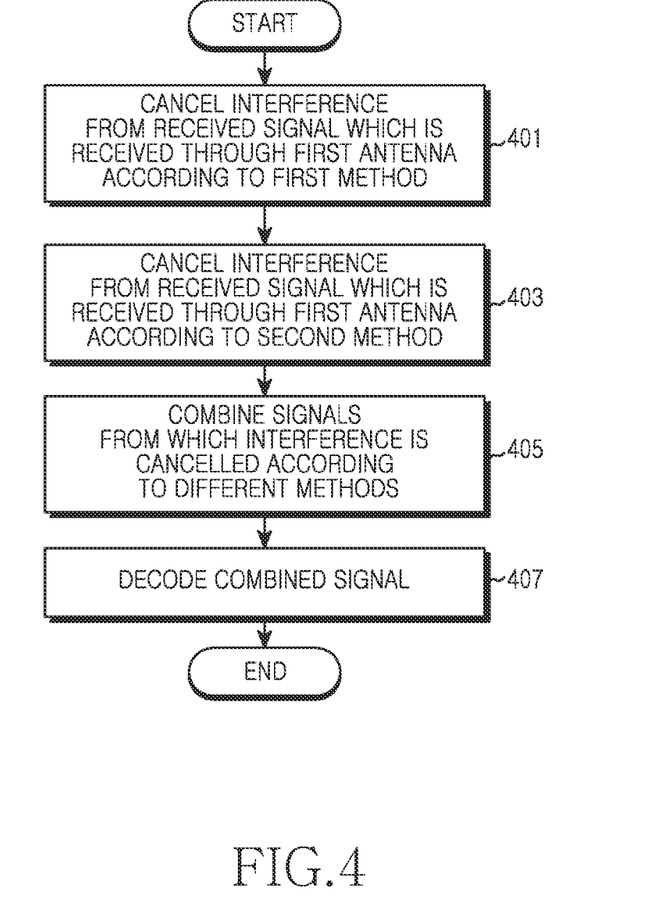
FIG. 4 is a diagram illustrating an operation process of a receiving apparatus in a wireless communication system according to an embodiment of the present disclosure.

FIG. 4 is a diagram illustrating an operation process of a receiving apparatus in a wireless communication system according to an embodiment of the present disclosure.

Referring to FIG. 4, at operation 401, the receiving apparatus cancels interference from a received signal which is received through a first antenna according to a first method. For example, the first method may be a method for canceling co-channel interference. In this case, the receiving apparatus may cancel the co-channel interference from the received signal, for example, according to a MSE method.

At operation 403, the receiving apparatus cancels interference from the received signal which is received through the first antenna according to a second method. For example, the second method may be a method for canceling adjacent channel interference. In this case, the receiving apparatus may cancel the adjacent channel interference from the received signal, for example, according to a LPF method.

Thereafter, at operation 405, the receiving apparatus combines signals from which interference is cancelled according to different methods. For example, the receiving apparatus combines the signal from which interference is cancelled according to the first method at operation 401 and the signal from which interference is cancelled according to the second method at operation 403. In this case, the combination ratios of the signals may be equal to or different from each other. When the combination ratios are different from each other, the receiving apparatus may combine the signals according to predefined combination ratios. Although not illustrated in FIG. 4, the receiving apparatus may calculate the combination ratios. For example, the receiving apparatus may calculate the combination ratios according to a MRC method. Specifically, the receiving apparatus may estimate the magnitude of noise added to each of interference-cancelled signals and determine the combination ratios such that each of the combination ratios is inversely proportional to the magnitude of the noise, in order words, such that relative weights decrease as the noise increases.

After the signals are combined at operation 405, the receiving apparatus proceeds to operation 407 at which the receiving apparatus performs decoding by using the combined signal. The decoding is performed correspondingly to encoding performed by a transmitting apparatus. The decoding may be a binary decoding or an M-ary decoding, the alphabet size of which is 3 or more.

In the embodiment illustrated in FIG. 4, the receiving apparatus performs interference cancellation twice according to the first method in operation 401 and the second method in operation 403. However, according to various embodiments of the present disclosure, the receiving apparatus may perform interference cancellation according to various numbers of methods. For example, according to another embodiment of the present disclosure, the receiving apparatus may further perform interference cancellation according to a third scheme. In this case, the receiving apparatus combines three signals at operation 405. According to another embodiment of the present disclosure, four or more interference methods may be used.

In the embodiment illustrated in FIG. 4, the receiving apparatus cancels interference independently according to respective methods and combines the interference-cancelled signals. Although not illustrated in FIG. 4, the receiving apparatus may further perform a process of equalizing respective interference-cancelled singles after interference cancellation and before combination.

When using various embodiments according to the present disclosure as described above, a reception diversity gain may be obtained as if a plurality of receiving antennas are used by using only one receiving antenna in an environment in which many types of interference signals exist that are to be cancelled in a receiving system. In addition, because various embodiments of the present disclosure apply respective signal processing methods for canceling an interference signal in parallel, the respective processing methods for canceling an interference signal do not influence each other. Therefore, unexpected signal distortion may be removed which may occur during signal processing. In addition, because the interference signal cancellation units are connected in parallel, the respective interference signal cancellation units may be controlled independently, thereby simplifying the structure of a controller.

Figure 5:
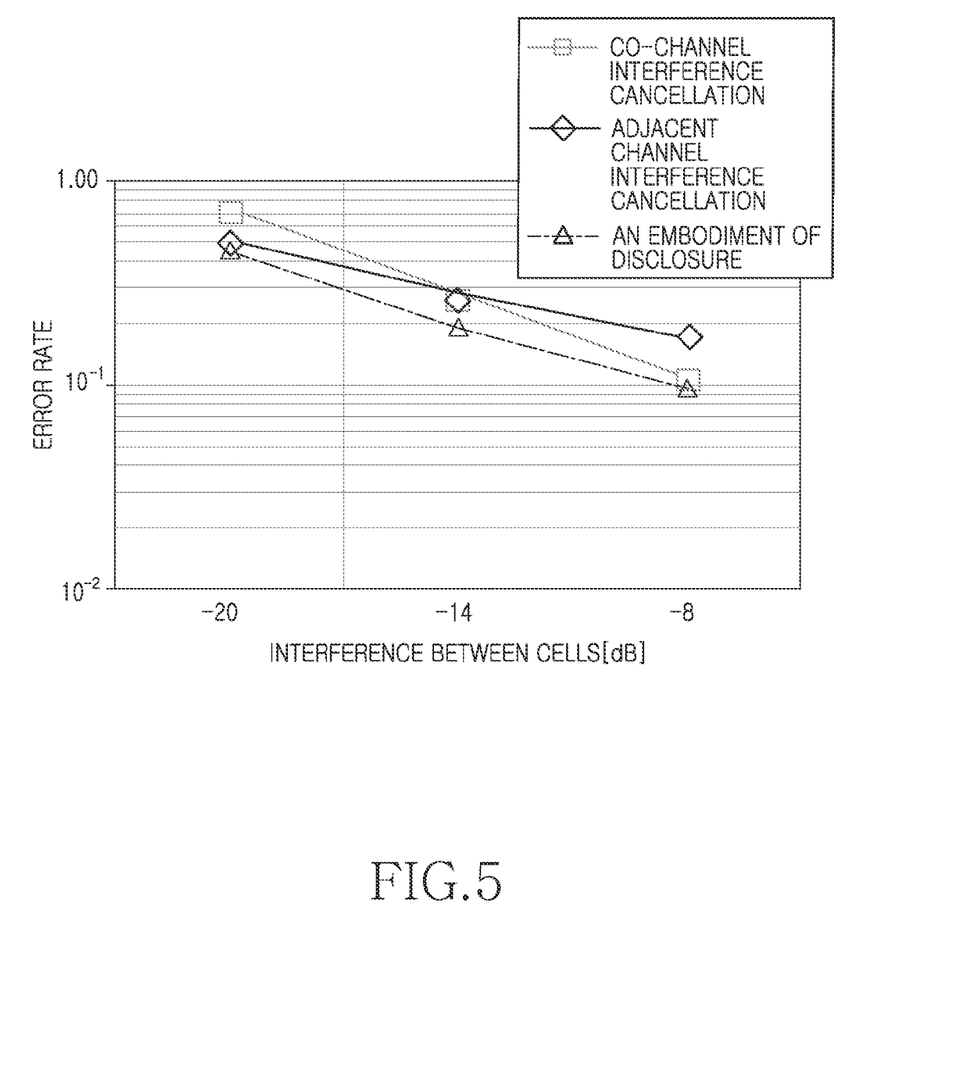
FIG. 5 is a diagram illustrating performance test results of a wireless communication system according to an embodiment of the present disclosure.

FIG. 5 is a diagram illustrating performance test results of a wireless communication system according to an embodiment of the present disclosure.

Referring to FIG. 5, simulation test results with respect to a receiving apparatus to which the present disclosure is applied and a receiving apparatus to which technology is applied are illustrated.

The simulation test has been performed based on a GSM system. The environment used for the simulation test was set to TU50 channel environment, and SNR was set to 10 dB. In this case, an error occurrence rate was measured as adjacent channel interference is changed to −20 dB, −14 dB and −8 dB. When co-channel interference is only performed as the conventional technology, adjacent channel interference was only used. As illustrated in FIG. 5, an embodiment of the present disclosure has excellent performance compared to the technology according to the related art.

The methods according to the embodiments described in the claims and/or specification of the present disclosure may be implemented by hardware, software, or a combination thereof.

When the methods are implemented by software, a non-transitory computer-readable storage medium may be provided to store one or more programs (software modules). The one or more programs stored in the non-transitory computer-readable storage medium may be configured for execution by one or more processors in an electronic device. The one or more programs may include instructions for causing the electronic device to execute the methods according to the various embodiments described in the claims and/or specification of the present disclosure.

These programs (software modules or software) may be stored in Random Access Memories (RAMs), nonvolatile memories including flash memories, Read Only Memories (ROMs), Electrically Erasable Programmable ROMs (EEPROMs), magnetic disc storage devices, Compact Disc-ROMs (CD-ROMs), Digital Versatile Discs (DVDs), other types of optical storage devices, magnetic cassettes, and/or the like. In addition, the programs may be stored in a memory configured by a combination of some or all of such storage devices. Also, each of the memories may be provided in plurality.

In addition, the programs may be stored in an attachable storage device that can be accessed by the electronic device through a communication network such as Internet, Intranet, Local Area Network (LAN), Wireless LAN (WLAN), or Storage Area Network (SAN), or through a communication network configured by a combination thereof. This storage device may access a device for performing the various embodiments of the present disclosure through an external port. In addition, a separate storage device on a communication network may access a device for performing the various embodiments of the present disclosure.

The respective interference signal cancellation units are connected in parallel in the wireless communication system, and the outputs thereof are combined, thereby canceling interference and obtaining a combination gain similar to the case of using a plurality of receiving antennas by using one antenna.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A receiving apparatus in a wireless communication system, the receiving apparatus comprising:
a first interference cancellation unit configured to cancel interference from a received signal that is received through an antenna according to a first scheme and to output a first interference-cancelled signal;
a first estimation and equalization unit configured to estimate a first channel, to equalize the first interference-cancelled signal based on the estimated first channel and to output a first equalized signal;
a second interference cancellation unit configured to cancel interference from the received signal that is received through the antenna according to a second scheme and to output a second interference-cancelled signal;
a second equalization unit configured to estimate a second channel, to equalize the second interference-cancelled signal based on the estimated second channel and to output a second equalized signal; and a combination unit configured to combine the first equalized signal and the second equalized signal.

2. The receiving apparatus of claim 1,
wherein the first scheme corresponds to an interference cancellation scheme for canceling co-channel interference, and
wherein the second scheme corresponds to an interference cancellation scheme for canceling adjacent channel interference.

3. The receiving apparatus of claim 1, further comprising:
a control unit configured to determine combination ratios for combining the first and second equalized signals.

4. The receiving apparatus of claim 3, wherein the control unit is further configured to determine the combination ratios according to a Maximum Ratio Combining (MRC) method.

5. The receiving apparatus of claim 3, wherein the control unit is further configured to determine the combination ratios based on at least one of a noise magnitude and a signal magnitude included in each of the first and second equalized signals to be combined.

6. The receiving apparatus of claim 1, further comprising:
a third interference cancellation unit configured to cancel interference from the received signal that is received through the antenna according to a third scheme.

7. The receiving apparatus of claim 1, wherein the first scheme differs from the second scheme.

8. A method for operating a receiving apparatus in a wireless communication system, the method comprising:
canceling interference from a received signal that is received through an antenna according to a first scheme and outputting a first interference-cancelled signal;
estimating a first channel, equalizing the first interference-cancelled signal based on the estimated first channel and outputting a first equalized signal;
canceling interference from the received signal that is received through the antenna according to a second scheme and outputting a second interference-cancelled signal;
estimating a second channel, equalizing the second interference-cancelled signal based on the estimated second channel and outputting a second equalized signal; and
combining the first equalized signal and the second equalized signal.

9. The method of claim 8, wherein the first scheme corresponds to an interference cancellation scheme for canceling co-channel interference, and the second scheme corresponds to an interference cancellation scheme for canceling adjacent channel interference.

10. The method of claim 8, further comprising:
determining combination ratios for combining the first and second equalized signals.

11. The method of claim 10, wherein the combination ratios are determined according to a Maximum Ratio Combining (MRC) method.

12. The method of claim 10, wherein the combination ratios are determined based on at least one of a noise magnitude and a signal magnitude included in each of the first and second equalized signals to be combined.

13. The method of claim 12, further comprising:
canceling interference from the received signal that is received through the antenna according to a third scheme.

14. The method of claim 8, wherein the first scheme differs from the second scheme.

15. A non-transitory computer-readable storage medium storing instructions that, when executed, cause at least one processor to perform the method of claim 8.

16. A receiving apparatus in a wireless communication system, the receiving apparatus comprising:
a plurality of interference cancellation units connected in parallel to each other and configured to cancel interference from a signal received through an antenna independently according to different methods and to output interference-cancelled signals;
a plurality of estimation and equalization units, each estimation and equalization unit of the plurality of estimation and equalization units respectively corresponding to an interference cancellation unit of the plurality of interference cancellation units, and each of the estimation and equalization units being configured to estimate a channel and equalize the interference-cancelled signal output from the corresponding interference cancellation unit based on the estimated channel and to output a respective equalized signal;
a combination unit configured to combine the respective equalized signals and to output a combined interference-cancelled signal; and
a decoder configured to perform decoding on the combined interference-cancelled signal, as combined by the combination unit.

* * * * *